INVENTOR.
ROBERT C. EVANS
BY *Ross W. Campbell*
ATTORNEY

United States Patent Office 3,298,471
Patented Jan. 17, 1967

3,298,471
VALVE FOR HYDRAULIC BRAKE
HOLDING SYSTEM
Robert C. Evans, 623 Prospect St., Apt. 2,
Flint, Mich. 48503
Filed Nov. 6, 1964, Ser. No. 409,452
1 Claim. (Cl. 188—152)

The present invention relates to hydraulic brake control devices and more particularly to improved means for releasably holding hydraulic brakes engaged.

An object of the invention is to provide improved means for releasably holding hydraulic brakes engaged.

Another object of the invention is to provide an improved valve for releasably holding engaged the hydraulic brakes of a motor vehicle having a hydraulic brake system.

A further object of the invention is to provide in a valve for releasably holding hydraulic brakes engaged improved means for utilizing hydraulic pressure within the valve chamber to assist in opening said valve.

The above and other objects of the invention which will later become apparent as the following description proceeds, are attained by the present invention, a preferred embodiment of which has been illustrated, by way of example only, in the accompanying drawings, forming a part of the specification, in which like characters are employed to designate like parts throughout the same, and wherein.

Figure 1:
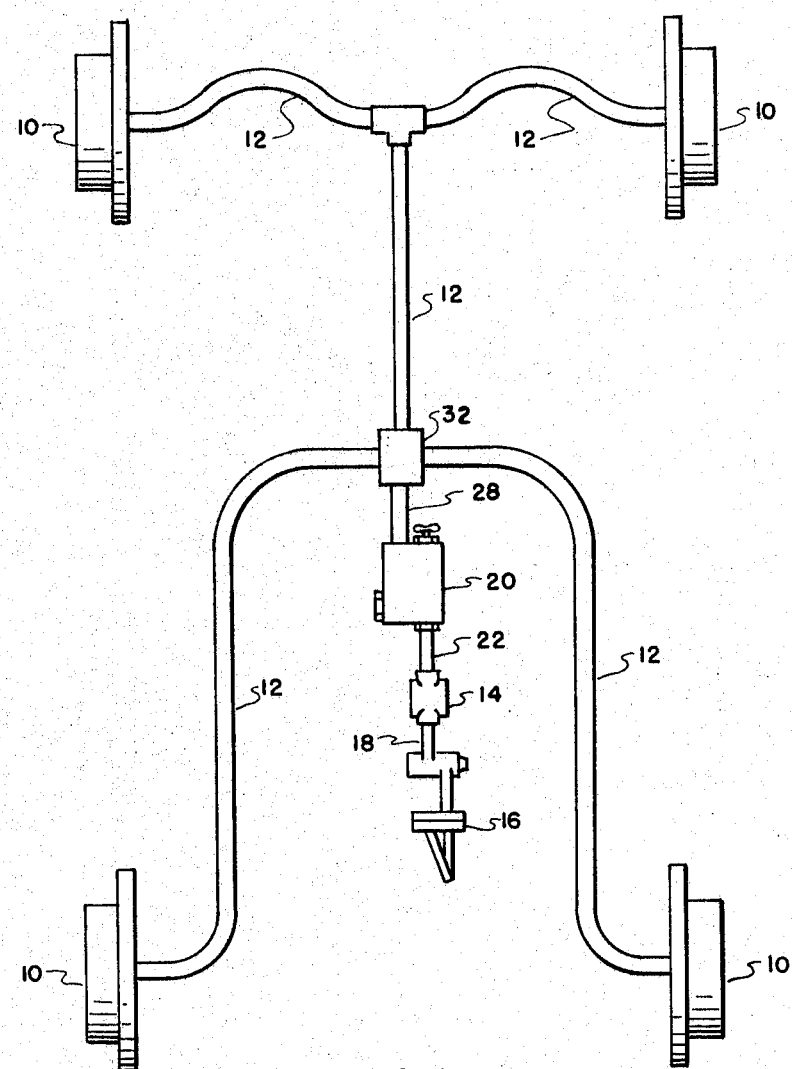
FIGURE 1 is a schematic view of the hydraulic brake system of a motor vehicle with the present invention associated therewith.
Figure 2:
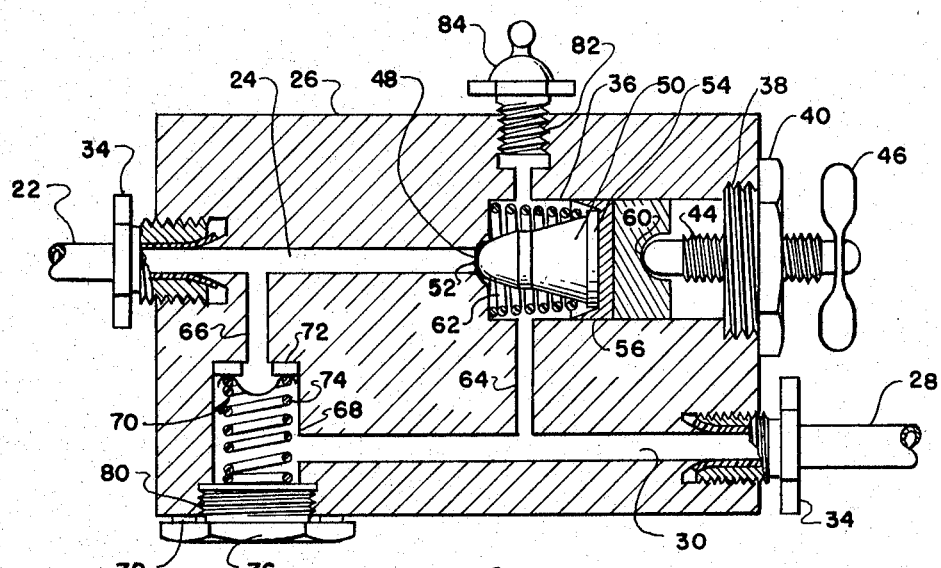
FIGURE 2 is an enlarged, side elevational view of the present invention, partially in section, showing the improved main valve means thereof in closed position.
Figure 3:
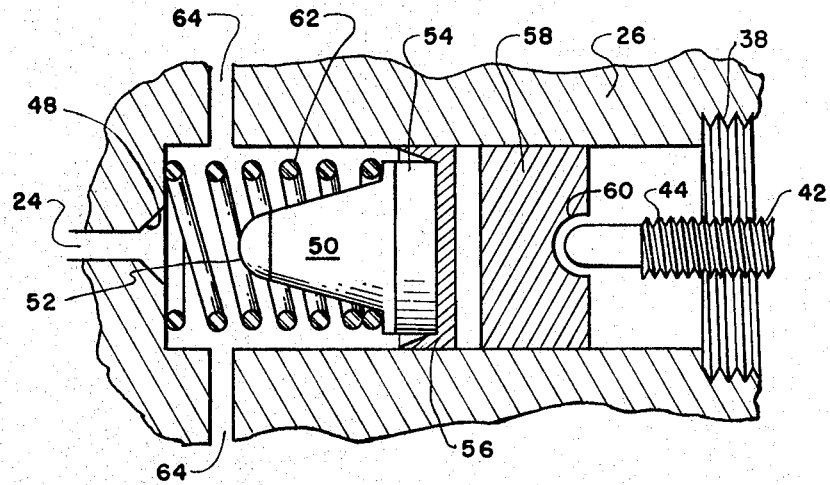
FIGURE 3 is an enlarged, side elevational view of the improved main valve means of the present invention, showing the valve in open position.

Referring now more particularly to the drawings, FIGURE 1 shows a conventional hydraulic brake system of a motor vehicle, including brakes 10 each connected by conventional hydraulic fluid conduits 12 to a conventional brake master cylinder 14, the piston (not shown) of which is actuated by vehicle pedal 16 through a piston rod 18 in the usual manner well known in the art. The brake holder 20 of the present invention is operatively connected into the conventional hydraulic brake system of a motor vehicle by a short length of hydraulic fluid conduit 22 which communicates the outlet of master cylinder 14 with an inlet passage 24 bored longitudinally through metal casing 26 of the brake holder, and by another length of hydraulic fluid conduit 28 which communicates an outlet passage 30 bored longitudinally into the casing with conventional hydraulic fluid conduits 12 of the brake system at the conventional common juncture 32 of the latter. As shown in FIGURE 2, conduits 22 and 28 are connected to passages 24 and 30 by conventional fittings 34. The hydraulic fluid conduit which previously connected master cylinder 14 with juncture 32 may serve as conduit 28.

The end of inlet passage 24 remote from conduit 22 is counterbored to form a cylindrical valve chamber 36. Another counterbore 38 is then formed in the extreme end of bore 36 and threaded to receive a threaded plug 40. Plug 40 bears a threaded central aperture 42 which extends axially therethrough and threadably receives the threaded stem 44 of a thumbscrew 46. The mouth of inlet passage 24 at its juncture with chamber 36 is ground to form a valve seat 48.

A conical valve member 50 is provided and bears a rounded tip 52 formed of neoprene or other resilient material, adapted to seat firmly against valve seat 48. A circular flange 54 surrounds the base of valve member 50 and is snugly received within a cup-shaped gasket 56, the sidewalls of which are forwardly directed to surround the flange and rest against the circular wall of chamber 36.

A cylindrical piston member 58, preferably formed of aluminum and having a hemispherical recess 60 centrally located in the rear thereof, is slidably arranged within chamber 36 with its flat forward surface abutting the rear of gasket 56. The forward end of stem 44 of thumbscrew 46 is hemispherically rounded so as to be rotatably received within recess 60.

A helical spring 62 surrounds valve member 50 within chamber 36, with one end pressing against the end of chamber 36 surrounding valve seat 48 and with the other end pressing against the forward surface of flange 54 so as to yieldingly urge valve member 50, tip 52, gasket 56, and piston member 58 axially rearward, away from valve seat 48, so as to unseat the tip from the valve seat when stem 44 is withdrawn by counterclockwise rotation of thumbscrew 46. When thumbscrew 46 is rotated clockwise, stem 44 forces piston 58, gasket 56, valve member 50, flange 54, and tip 52 axially forward in the direction of valve seat 48 until the tip seats firmly against the valve seat, thus sealing off inlet channel 24 against the flow of hydraulic fluid therethrough.

A transverse bore 64 extends through one side of casing 26, through chamber 36, and communicates with outlet passage 30. Outlet passage 30 does not extend completely through casing 34, but communicates with inlet passage 24 through a bore 66 and a counterbore 68 which extend radially through the wall of casing 26. Bore 68 contains a conventional check valve generally indicated at 70 arranged to seat against a valve seat 72 under pressure from a helical spring 74 so as to permit flow of hydraulic fluid from inlet passage 24 to outlet passage 30 when the hydraulic pressure in inlet passage 24 and bore 66 exceeds the pressure of spring 74, but prevents any flow whatsoever of hydraulic fluid from outlet passage 30 into bore 66 and inlet passage 24. Counterbore 68 is sealed from the atmosphere by a threaded plug 76 which extends through a gasket 78 and is threadably engaged with a threaded counterbore 80.

A counterbore 82 is formed in the exposed end of bore 64, and is threaded to receive a threaded plug 84, thereby providing means venting chamber 36 with the external atmosphere for the purpose of relieving hydraulic pressure or air trapped within the chamber.

During normal operation of the motor vehicle thumbscrew 46 remains substantially withdrawn from bore 36, so that spring 62 spaces piston 58, gasket 56, flange 54, valve member 50, and tip 52 from the front of chamber 36 and maintains the tip unseated from valve seat 48. When pressure is then applied to brake pedal 16, hydraulic pressure thereby created within master cylinder 14 is transmitted through conduit 22, inlet passage 24, chamber 36, bore 64, outlet passage 30, and conduit 28 to conventional conduits 12 and wheel cylinders 10, whereby the brakes of the vehicle are actuated in the usual manner. When pressure is relieved from brake pedal 16, such hydraulic pressure is relieved in the reverse direction.

When, however, it is desired to change a tire or effect some other repair upon the vehicle, the operator can utilize brake holder 20 to retain the hydraulic brakes securely engaged.

When thumbscrew 46 is manually rotated in a clockwise direction, stem 44 forces piston 58 against gasket 56, and the gasket against valve member 50, whereby the valve member is forced axially forward until tip 52 is seated firmly against valve seat 48. When pressure is thereafter applied to brake pedal 16, hydraulic pressure will be created within inlet passage 24. Since inlet passage 24 is sealed by engagement of tip 52 with valve seat 48, such pressure cannot be conducted through chamber 36 or bore 64. The hydraulic pressure within inlet passage 24 and bore 66, however, overcomes the relatively slight pressure of spring 74 and opens check valve 70, whereby the hydraulic pressure bypasses chamber 36 and bore 64 and is transmitted through bore 66, counterbore 68, and outlet passage 30 to conduit 28 and hence to conventional conduits 12 and brake cylinders 10 to engage the brakes. The pressure within the brake cylinders, conduits 12 and 28, and outlet passage 30 will not be relieved when pressure is released from foot pedal 16, since inlet passage 24 is sealed by tip 52 and since bore 66, which leads to the inlet passage, is also sealed against flow in such direction by check valve 70. Consequently, brakes 10 remain engaged. The operator or other repairmen may then change tires or perform other repair work on or under the vehicle with absolute assurance that his life will not be endangered by accidental release of the brakes of the vehicle.

When, upon completion of the repairs, it is desired to release the brakes, thumbscrew 46 is manually rotated in a counterclockwise direction, thereby freeing piston 58, gasket 56, flange 54, valve member 50, and tip 52 for rearward movement. The hydraulic pressure within chamber 36, acting upon the sloped surface of valve member 50 and the exposed areas of flange 54 and the sidewall of gasket 56, and the forward surfaces of spring 62 then instantly drives the valve member, flange, gasket, piston member 58, and tip 52 rearward unseating the tip from valve seat 48, and relieving the hydraulic pressure within the chamber, bore 64,, outlet channel 30, conduits 28 and 12, and the wheel cylinders, whereby the brakes are released. It will be particularly noted that this action is not dependent upon the functioning of spring 62, and will cause the valve to be opened even if the spring be broken or absent.

If air becomes trapped within chamber 36 during installation of the device or as a result of leakage in the hydraulic system thumbscrew 46 may be rotated in a clockwise direction to seat tip 52 against valve seat 48 and brake pedal 16 then depressed to pressurize the hydraulic fluid within chamber 36. Plug 84 may then be unscrewed sufficiently to permit such entrapped air to be expelled through bore 64 and counterbore 82 to the external atmosphere. Plug 84 may then be retightened and thumbscrew 46 rotated in a counterclockwise direction so as to release tip 52 from valve seat 48.

A most important feature of the present invention is the conical shape of valve member 50. The sloped sidewall of valve member 50 provides a substantial surface area normal to the axis of movement of the member. When the hydraulic fluid filling chamber 36 is placed under pressure, a substantial component of such pressure will impinge upon the sloped sidewall of the valve member and be directed axially rearward in a direction away from valve seat 48. This substantial rearwardly-directed increment of force, together with the similar but lesser force upon the smaller exposed areas of flange 54, the forward end of the sidewall of gasket 56, and the forward surfaces of spring 62, is parallel to the axis of movement of valve member 50 and results in immediate and positive unseating of tip 52 from valve seat 48 when released by counterclockwise rotation of thumbscrew 46. The greater the pressure which was applied to the brake lines when the brakes were engaged, the more rapid and positive the unseating of tip 52 from valve seat 48 when the sliding elements of the brake holder have been released by counterclockwise rotation of thumbscrew 46. This structural and functional feature of the invention has the further advantage of permitting the brake holder to be rapidly and positively disengaged even if spring 62 should become broken, and hence constitutes an improved safety feature of great importance.

It will be further noted that the forwardly directed sidewall of cup-shaped gasket 56 is so arranged that the greater the hydraulic pressure within chamber 66, the greater the force acting outward upon the sidewall of the gasket and forcing it into intimate contact with the cylindrical wall of chamber 36, thereby maintaining a positive seal to prevent passage of hydraulic fluid from chamber 36 rearwardly past the gasket.

It is to be understood that the form of the invention herewith shown and described is to be taken as a preferred embodiment of the same and that resort may be had to various changes in construction without departing from the scope of the subjoined claim.

What is claimed is:

Brake holding means for a motor vehicle having a hydraulic brake system including a master brake cylinder and wheel brake cylinders arranged to receive hydraulic pressure from said master cylinder to apply wheel brakes, comprising, in combination,
  a casing,
  a cylindrical valve chamber in said casing,
  an inlet passage to communicate said chamber with said master brake cylinder,
  a valve seat concentrically disposed at one end of said chamber and forming the mouth of said inlet passage,
  a conical valve member disposed within said chamber,
  a resilient tip at the small end of said valve member and adapted to seat within said valve seat,
  a circular flange surrounding the base of said valve member,
  a cup-shaped gasket slideably arranged within said chamber and having a forwardly directed sidewall surrounding said flange,
  a cylindrical piston member slidably arranged within said chamber and abutting the rear of said gasket,
  a threaded counterbore at the end of said chamber opposite said valve seat,
  a threaded plug threadably engaged with said threaded counterbore, said plug having a threaded aperture extending axially therethrough,
  a helical spring within said chamber and surrounding said conical valve member between said end in which said valve seat is disposed and said flange, and arranged to yieldingly urge said flange, valve member, tip, gasket and piston member axially rearward to unseat said tip from said valve seat,
  a thumbscrew threadably engaged with said threaded aperture in said plug and adapted to be extended into said chamber to contact and move said piston member forward against said gasket and to force said gasket, flange, valve member, and tip axially forward against pressure of said spring to seat said tip in said valve seat when said thumbscrew is rotated in one direction, and to permit said tip, piston member, flange, gasket, and valve member to be moved rearwardly by said spring to unseat said tip from said valve seat when said thumbscrew is rotated in an opposite direction,
  an outlet passage to communicate said chamber with said wheel brake cylinders,
  a bypass passage between said inlet and outlet passages,
  a spring-loaded, one-way check valve in said bypass passage to permit flow of hydraulic fluid from said inlet passage to said outlet passage and to bypass said main valve chamber and to prevent flow of hydraulic fluid through said bypass passage in a reverse direction, the sloped sidewall of said conical valve member, together with exposed portions of said flange, gasket, and spring, presenting a substantial surface area within said chamber and normal to the axis of movement of said valve member to assist axial movement of said valve member, tip, gasket, and piston in a direction away from said valve seat and to unseat said tip from said valve seat in response to hydraulic pressure within said chamber when said thumbscrew is rotated in said opposite direction, a threaded bore extending through the wall of said casing and into said chamber to communicate said chamber with the external atmosphere, and a threaded plug releasably sealing said threaded bore.

References Cited by the Examiner

UNITED STATES PATENTS

| 269,531 | 12/1882 | McGinley | 251—321 |
| 2,224,747 | 12/1940 | Sacks et al. | 188—156 |
| 2,307,949 | 1/1943 | Phillips | 137—598 X |
| 2,345,280 | 3/1944 | Morgan et al. | 188—156 |
| 2,392,501 | 1/1946 | Pool | 251—321 |
| 2,601,909 | 7/1952 | Seppmann | 188—152 |
| 2,874,718 | 2/1959 | Kelly | 251—323 X |

FOREIGN PATENTS

| 215,465 | 5/1958 | Austria. |
| 358,781 | 9/1922 | Germany. |

MILTON BUCHLER, *Primary Examiner.*

G. E. A. HALVOSA, *Assistant Examiner.*